US012389504B2

(12) United States Patent
Zheng

(10) Patent No.: US 12,389,504 B2
(45) Date of Patent: Aug. 12, 2025

(54) COLOR-TEMPERATURE ADJUSTMENT DEVICE AND LAMP

(71) Applicant: Hongbing Zheng, Hangzhou (CN)

(72) Inventor: Hongbing Zheng, Hangzhou (CN)

(73) Assignee: Hongbing Zheng, Hangzhou (CN)

( * ) Notice: Subject to any disclaimer, the term of this patent is extended or adjusted under 35 U.S.C. 154(b) by 232 days.

(21) Appl. No.: 18/218,020

(22) Filed: Jul. 4, 2023

(65) Prior Publication Data

US 2024/0015865 A1 Jan. 11, 2024

(30) Foreign Application Priority Data

Jul. 7, 2022 (CN) ........................ 202221755552.X

(51) Int. Cl.

*H05B 45/24* (2020.01)
*H01R 13/641* (2006.01)
*F21V 23/06* (2006.01)

(52) U.S. Cl.

CPC ........... *H05B 45/24* (2020.01); *H01R 13/641* (2013.01); *F21V 23/06* (2013.01)

(58) Field of Classification Search

CPC ...... H05B 45/24; H05B 45/20; H01R 13/641; H01R 24/20; H01R 24/28; F21V 23/06
USPC .......................................................... 315/291
See application file for complete search history.

(56) References Cited

U.S. PATENT DOCUMENTS 11,657,691 B2 * 5/2023 Chen ...................... H05B 47/11 315/154
11,719,421 B1 * 8/2023 Philip ....................... F21S 6/00 242/588.5
2011/0062888 A1 * 3/2011 Bondy ............... H05B 45/3725 315/294
2024/0015865 A1 * 1/2024 Zheng ................. H01R 13/641

* cited by examiner

*Primary Examiner* — Ryan Jager
(74) *Attorney, Agent, or Firm* — IPRTOP LLC

(57) ABSTRACT

A color-temperature adjustment device and a lamp are provided. The color-temperature adjustment device includes a plug-in male terminal and a plug-in female terminal. A first end of the plug-in male terminal is connected to a first end of the plug-in female terminal, and a second end of the plug-in male terminal is configured to connect to a light-emitting component. A second end of the plug-in female terminal is configured to connect to a power supply component. By connecting the plug-in male terminal to the plug-in female terminal from different directions, the color temperature of the light-emitting component can be adjusted. The plug-in male terminal includes a first pin and at least two second pins. The plug-in female terminal includes a first socket and at least two second sockets. The first pin is configured to insert into the first socket. The second pin is configured to insert into the second socket.

10 Claims, 5 Drawing Sheets

COLOR-TEMPERATURE ADJUSTMENT DEVICE AND LAMP

FIELD OF THE INVENTION

The present disclosure generally relates to technical field of color-temperature adjustment of lamps, and in particular relates to a color-temperature adjustment device and a lamp.

BACKGROUND OF THE INVENTION

LED downlights are a type of lighting fixture that is recessed into the ceiling and shines light downwards. This hidden fixture, which is mounted inside the ceiling, has evolved to include the ability to adjust its color temperature, allowing for different colored lighting effects. They are often used in hotels, homes, and coffee shops.

Current color-temperature-adjustable LED downlights usually have a switch for adjusting color temperature located either on the body of the downlight itself or inside a power supply box (which is located within the ceiling). This means that when adjusting the color temperature of the downlight, it's often necessary to disassemble the power supply box in order to access the switch, which can be complicated and inconvenient for users.

SUMMARY OF THE INVENTION

The present disclosure provides a color-temperature adjustment device and a lamp.

The color-temperature adjustment device includes a plug-in male terminal and a plug-in female terminal. A first end of the plug-in male terminal is connected to a first end of the plug-in female terminal, and a second end of the plug-in male terminal is configured to connect to a light-emitting component. A second end of the plug-in female terminal is configured to connect to a power supply component. By connecting the plug-in male terminal to the plug-in female terminal from different directions, the color temperature of the light-emitting component can be adjusted. The plug-in male terminal includes a first pin and at least two second pins. The plug-in female terminal includes a first socket and at least two second sockets. The first pin is configured to insert into the first socket. The second pin is configured to insert into the second socket. Each second socket corresponds to a color temperature, and the at least two second sockets correspond to different color temperatures.

In an embodiment of the present disclosure, the plug-in male terminal is connected to the plug-in female terminal by a threaded connection when the two are connected.

In an embodiment of the present disclosure, the plug-in male terminal is provided with an indication mark, the plug-in female terminal is provided with at least two color temperature marks, and each of the at least two color temperature marks corresponds to one of the at least two second sockets; wherein when connecting the plug-in male terminal to the plug-in female terminal, the color temperature of the light-emitting component is adjusted by adjusting the orientation of the plug-in male terminal relative to the plug-in female terminal so that the indication mark points to different color temperature marks.

In an embodiment of the present disclosure, the color-temperature adjustment device also includes: a first connection line and a second connection line, wherein the plug-in male terminal is configured to connect to the light-emitting component via the first connection line, wherein the plug-in female terminal is configured to connect to the power supply component via the second connection line.

In an embodiment of the present disclosure, the plug-in male terminal and the plug-in female terminal are each formed by one-piece molding.

The present disclosure also provides a lamp, including: a light-emitting component, a power supply component, and the above-mentioned color-temperature adjustment device; the color-temperature adjustment device is connected to the light-emitting component and the power supply component, respectively; when the plug-in male terminal of the color-temperature adjustment device is connected to the plug-in female terminal of the color-temperature adjustment device with different relative orientations, the power supply component correspondingly outputs different currents to adjust the color temperature of the light-emitting component.

In an embodiment of the present disclosure, the power supply component includes a power supply circuit and a chip; the power supply circuit is connected to the chip and the plug-in female terminal, respectively, the chip is configured to control the power supply circuit to output different currents when the plug-in male terminal is connected to the plug-in female terminal with different relative orientations.

In an embodiment of the present disclosure, the light-emitting component includes: a light-emitting circuit, and the light-emitting circuit is connected to the plug-in male terminal.

In an embodiment of the present disclosure, the lamp further includes a first housing, and the power supply component is provided in the first housing.

In an embodiment of the present disclosure, the lamp also includes a second housing, and the light-emitting component is provided in the second housing.

As described above, the color-temperature adjustment device and the lamp described in the present disclosure have the following beneficial effects:

(1) Compared with the existing technology, the present disclosure transfers the color temperature adjustment function from the dip switch inside the power supply box to the plug-in male terminal and the plug-in female terminal. On the one hand, this eliminates the need for a dip switch, reduces the number of parts, and saves materials and manufacturing costs. On the other hand, it allows for setting the desired color temperature during the installation process of the lamp, achieving seamless switching of color temperature without the need of using a dip switch to change the color temperature after the wire connection has been completed=. This makes operation convenient and reliable, while also eliminating the need for low-reliability dip switches used for color temperature adjustment.

(2) After installation, if it is necessary to change the color temperature of the lamp, in the present disclosure all that is needed is to remove the light-emitting component and then reconnect the plug-in male terminal and plug-in female terminal with different relative orientations to change the color temperature. There is no need to remove the power supply box and then change the color temperature via a dip switch.

REFERENCE NUMERALS

Figure 1:
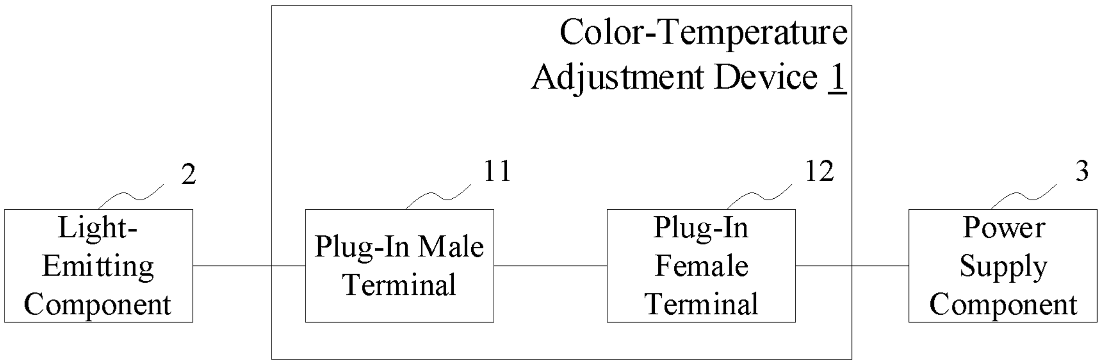
FIG. 1 is a block diagram of a color-temperature adjustment device in an embodiment of the present disclosure.

1 Color-temperature adjustment device
11 Plug-in male terminal
111 Thread
112 Indication mark
12 Plug-in female terminal
121 Nut
122 Color temperature mark
13 First connection line
14 Second connection line
2 Light-emitting component
21 Light-emitting circuit
3 Power supply component
31 Power supply circuit
32 Chip
8 Lamp
81 Light-emitting component
811 Light-emitting circuit
82 Power supply component
821 Power supply circuit
822 Chip
83 Color-temperature adjustment device

DETAILED DESCRIPTION

The embodiments of the present disclosure will be described below. Those skilled can easily understand disclosure advantages and effects of the present disclosure according to contents disclosed by the specification.

It should be noted that the structure, ratio, size, etc. shown in the accompanying drawings in this specification are only used to illustrate the content disclosed in the specification for the understanding and reading of those familiar with this technology, and are not intended to limit the implementation of the present invention. Any structural modification, proportional relationship change or size adjustment should still fall within the scope of the present disclosure, given that no effect and objective achievable by the present disclosure are hindered. Terms such as “upper”, “lower”, “left”, “right”, “middle”, and “a” used in this specification are only for ease of description, and they are not intended to limit the scope of implementation of the present disclosure. Any change or adjustment of corresponding relative relationships without any substantial technical change should be regarded as within the scope of the implementation of the present disclosure.

The color-temperature adjustment device and a lamp of the present disclosure are configured to solve the problem of the complex operation of color-temperature adjustment functions of existing downlights. The following will elaborate the principle and implementation of the color-temperature adjustment device and lamp of the present disclosure, so that the skilled person in the field can understand them without creative labor.

Refer to FIG. 1 to FIG. 8. In contrast to the existing technology, the color-temperature adjustment device and lamp of the present disclosure transfer the color temperature adjustment function from the dip switch inside the power supply box to the plug-in male and female terminals. On the one hand, this eliminates the need for a dip switch, reduces the number of parts, and saves materials and manufacturing costs. On the other hand, it allows for setting the desired color temperature during the installation process of the lamp, achieving seamless switching of color temperature without the need of using a dip switch to change the color temperature after the wire connection has been completed. This makes operation convenient and reliable, while also eliminating the need for low-reliability dip switches used for color temperature adjustment. After installation, if it is necessary to change the color temperature of the lamp, in the present disclosure all that is needed is to remove the light-emitting component and then reconnect the plug-in male terminal and the plug-in female terminal with different relative orientations to change the color temperature. There is no need to remove the power supply box or change the color temperature via a dip switch.

Figure 3:
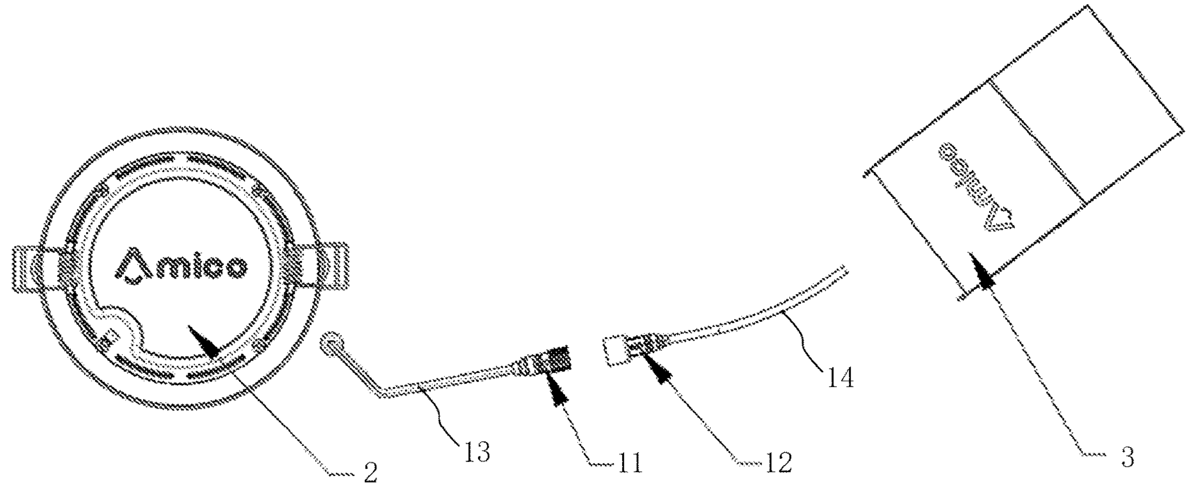
FIG. 3 shows an exploded view of a color-temperature adjustment device in an embodiment of the present disclosure.
Figure 4:
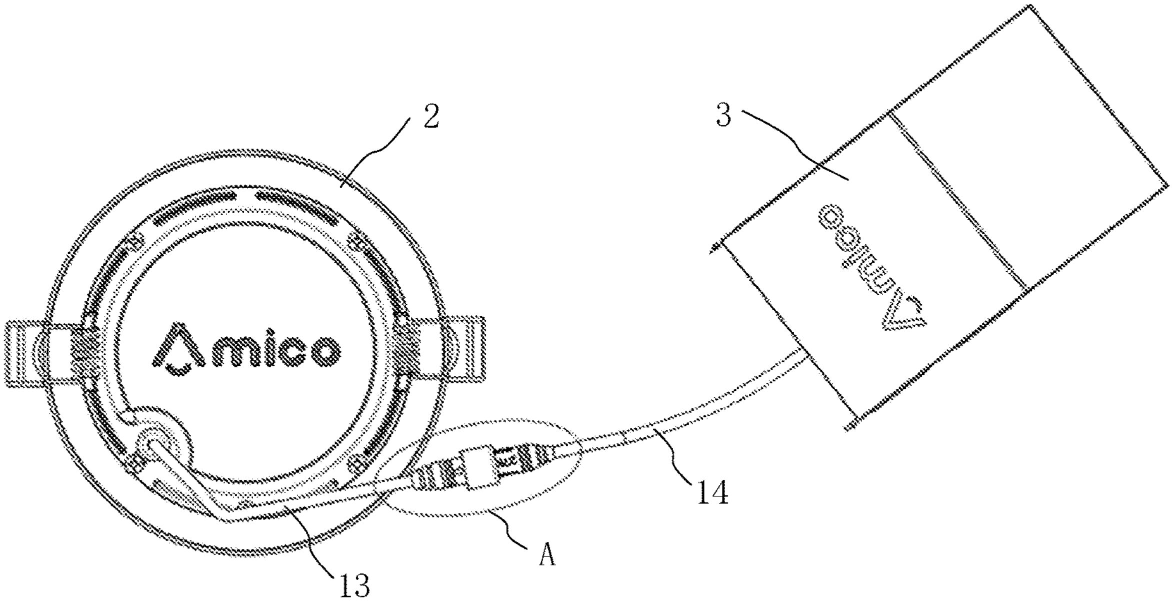
FIG. 4 is a schematic diagram showing the overall structure of a color-temperature adjustment device in an embodiment of the present disclosure.

As shown in FIG. 1, FIG. 3, and FIG. 4, in an embodiment, the color-temperature adjustment device 1 of the present disclosure includes a plug-in male terminal 11 and a plug-in female terminal 12.

Specifically, a first end of the plug-in male terminal 11 is connected to a first end of the plug-in female terminal 12, and a second end of the plug-in male terminal 11 is configured to connect to a light-emitting component 2; a second end of the plug-in female terminal 12 is configured to connect to a power supply component 3.

It is to be noted that a color temperature of the light-emitting component 2 is determined by an orientation of the plug-in male terminal 11 relative to the plug-in female terminal 12 when the two are connected;

It should be noted that the above-mentioned plug-in male terminal 11 and the plug-in female terminal 12 are independent of the light-emitting component 2 and the power supply component 3; when it is necessary to adjust the color temperature of the light-emitting component 2, the plug-in male terminal 11 and plug-in female terminal 12 are reconnected (by inserting the plug-in male terminal 11 into the plug-in female terminal 12 with a relative orientation corresponding to the desired color temperature). This present disclosure transfers the color temperature adjustment function from the dip switch inside the power supply box to the plug-in male terminal 11 and the plug-in female terminal 12, making operation more convenient. Compared with existing technology, this reduces the use of dip switches, making color temperature adjustment more convenient and reliable.

In an embodiment, the plug-in male terminal 11 includes a first pin (not shown in the figures) and at least two second pins (not shown in the figures); the plug-in female terminal 12 includes a first socket (not shown in the figures) and at least two second sockets (not shown in the figures); the first pin is configured to insert into the first socket; the second pins are configured to insert into the second sockets.

It is to be noted that each of the second sockets corresponds to a color temperature, and the at least two second sockets correspond respectively to different color temperatures.

Specifically, the first pin is a common pin (regardless of the orientation of the plug-in male terminal 11 when plugged into the plug-in female terminal 12, the part of the circuit where the first pin is located will always be conducted), by plugging the plug-in male terminal 11 into the plug-in female terminal 12 with different relative orientations, the conduction path between the power supply component 3 and the light-emitting component 2 can be changed, allowing the power supply component 3 to output different currents and adjust the color temperature of the light-emitting component 2.

It should be noted that for the at least two second pins, when the plug-in male terminal 11 is inserted into the plug-in female terminal 12 with a relative orientation corresponding to the desired color temperature, only the part of the circuit where the corresponding second pin is located is connected, the remaining parts of the circuit where the other second pin(s) are located are not connected, so that the light-emitting component 2 can have the desired color temperature.

Further, the number of second pins is not restricted; as long as it is more than 1, color-temperature adjustment can be achieved (if it is only 1, there will be correspondingly only one color temperature available, which means no color-temperature adjustment can be possible).

Figure 2:
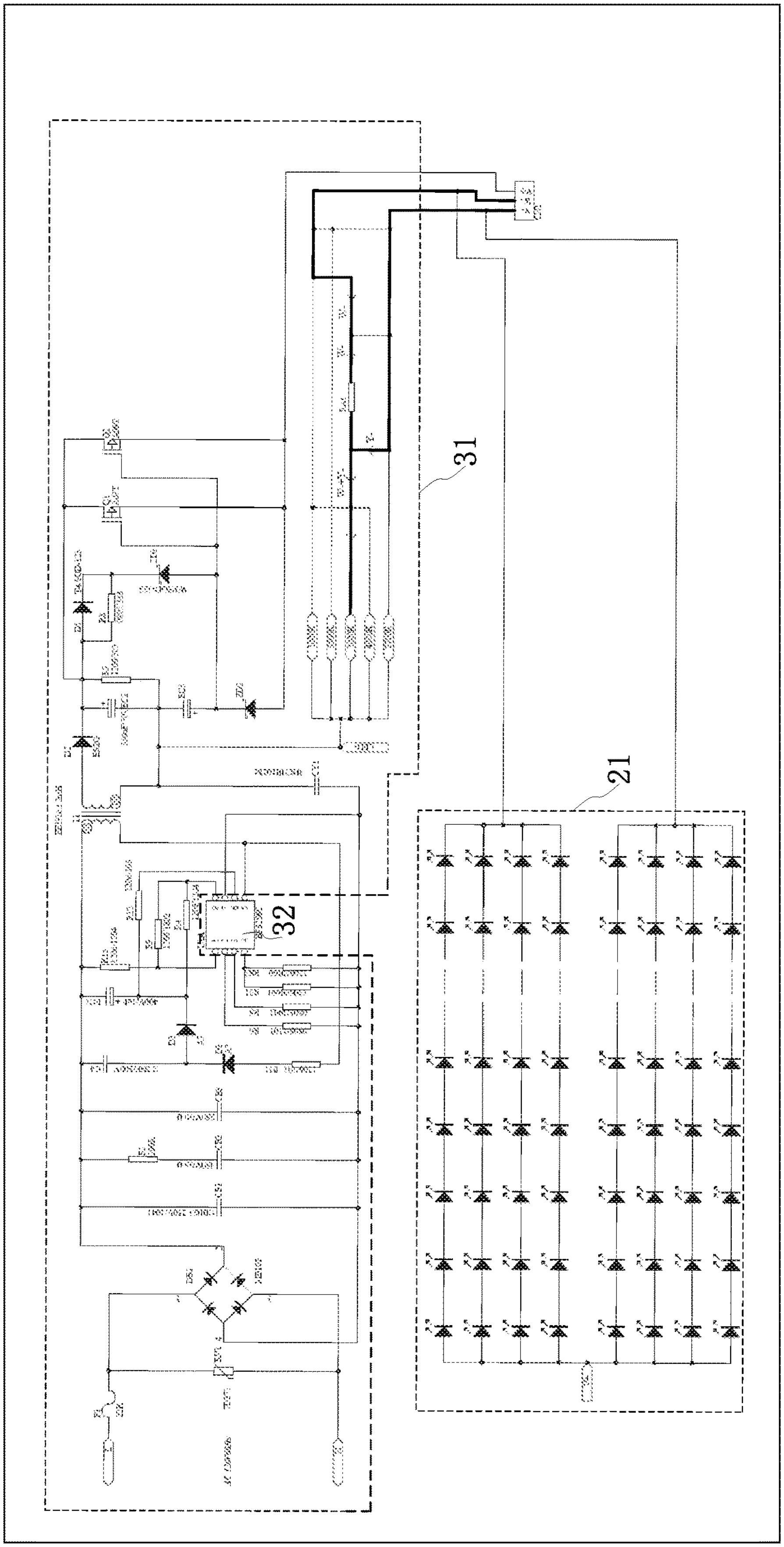
FIG. 2 is a schematic circuit diagram of a color-temperature adjustment device in an embodiment of the present disclosure.

As shown in FIGS. 1 and 2, in an embodiment, the light-emitting component 2 includes a light-emitting circuit 21.

Specifically, the light-emitting circuit 21 includes a plurality of light-emitting beads.

As shown in FIGS. 1 and 2, in an embodiment, the power supply component 3 includes a power supply circuit 31 and a chip 32.

Specifically, the power supply circuit 31 is connected to the chip 32 and the plug-in female terminal 12, respectively.

It should be noted that the chip 32 is so designed that when the plug-in male terminal 11 is connected to the plug-in female terminal 12 with different relative orientations, the chip 32 can control the power supply circuit 31 to output different currents.

In one embodiment, when the plug-in male terminal 11 is connected to the plug-in female terminal 12, the plug-in male terminal 11 is connected to the plug-in female terminal 12 by threaded connection.

It should be noted that the plug-in male terminal 11 and the plug-in female terminal 12 are connected by pins (including the first pin and the second pins) and sockets (including the first socket and the second sockets) as described above; in one embodiment, the plug-in male terminal 11 and the plug-in female terminal 12 are also connected by threaded connection, so that the plug-in male terminal 11 and the plug-in female terminal 12 are more securely and reliably connected.

Figure 5:
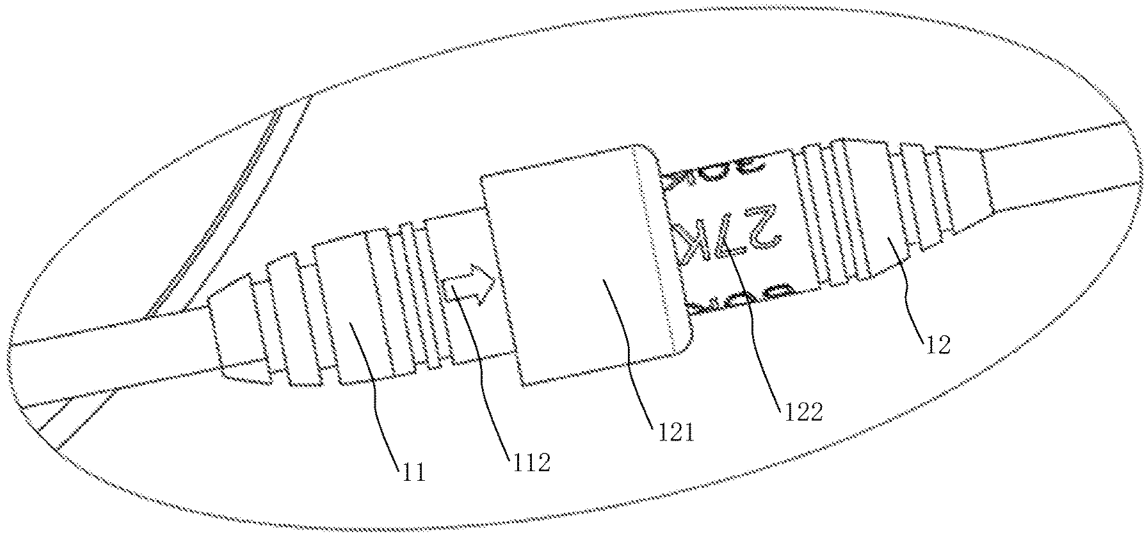
FIG. 5 is an enlarged view of A in FIG. 4 in an embodiment of the present disclosure.
Figure 6:
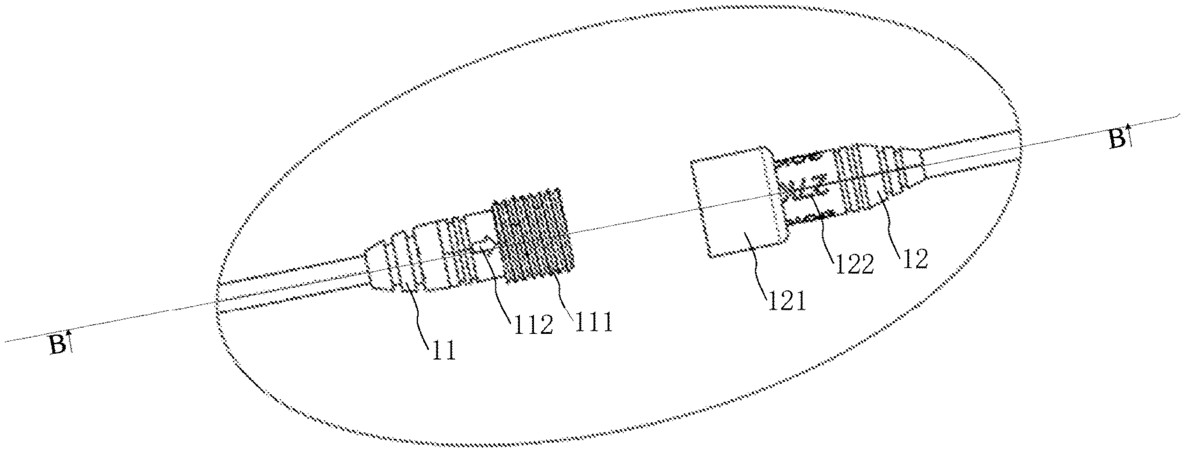
FIG. 6 is a schematic structural diagram showing a plug-in male terminal and a plug-in female terminal when they are not connected in an embodiment of the present disclosure.
Figure 7:
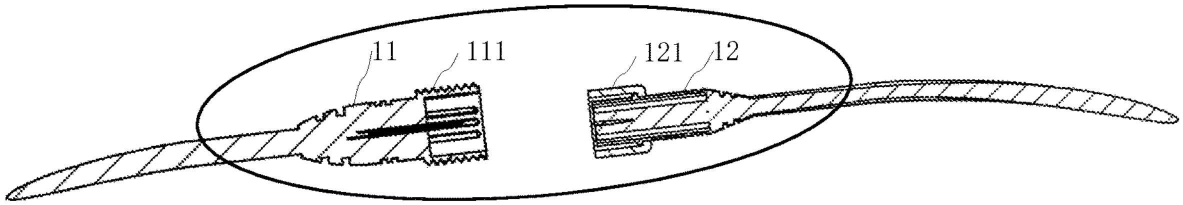
FIG. 7 is a cross-sectional view of the structure shown in FIG. 6 along the line BB in an embodiment of the present disclosure.

As shown in FIGS. 5 to 7, in one embodiment, the plug-in male terminal 11 is provided with a thread 111 at an end near the plug-in female terminal 12, and correspondingly, the plug-in female terminal 12 includes a nut 121; specifically, the nut 121 is located at an end of the plug-in female terminal 12 near the plug-in male terminal 11. The plug-in male terminal 11 and the plug-in female terminal 12 are connected by engaging the nut 121 and the thread 111.

In one embodiment, the plug-in female terminal 12 is threaded near the plug-in male terminal 11, and correspondingly, the plug-in male terminal 11 includes a nut; specifically, the nut is located at an end of the plug-in male terminal 11 near the plug-in female terminal 12, and configured to be engaged with the threads of the plug-in female terminal 12.

As shown in FIG. 5, in one embodiment, the plug-in male terminal 11 is provided with an indication mark 112; the plug-in female terminal 12 is provided with at least two color temperature marks 122; each of the color temperature marks 122 corresponds to one of the at least two second sockets.

It should be noted that when the plug-in male terminal 11 and the plug-in female terminal 12 are connected, the color temperature of the light emitting circuit 21 of the light-emitting component 2 is adjusted by adjusting the orientation of the plug-in male terminal 11 relative to the plug-in female terminal 12 so that the indication mark 112 points to different color temperature marks 122.

As shown in FIG. 5, in an embodiment, the indication mark 112 is in the shape of an arrow.

It should be noted that the indication mark 112 can also be in other shapes, as long as it can play a role of indication (that is, after the plug-in male terminal 11 and the plug-in female terminal 12 are connected, the indication mark 112 can clearly point to a color temperature mark 122); for example, the indication mark 13 can also be a straight line, a groove, or a ridge.

As shown in FIGS. 3 and 4, in one embodiment, the color-temperature adjustment device also includes a first connection line 13 and a second connection line 14.

Specifically, the plug-in male terminal 11 is configured to connect to the light-emitting circuit 21 of the light-emitting component 2 through the first connection line 13; the plug-in female terminal 12 is configured to connect to the power supply circuit 31 of the power supply component 3 through the second connection line 14.

In one embodiment, the plug-in male terminal 11 and the plug-in female terminal 12 are each formed by one-piece molding, which reduces cost.

The following specific embodiments are provided to further explain the working principle of the color-temperature adjustment device of the present disclosure.

In an embodiment, the plug-in male terminal 11 includes five second pins; correspondingly, the plug-in female terminal 12 includes five second sockets.

As shown in FIG. 2, in an embodiment, the five second pins correspond to the color temperatures 2700K, 3000K, 3500K, 4000K, and 5000K. respectively; assuming that in one embodiment, the desired color temperature is 3000K, then correspondingly, the plug-in male terminal 11 is connected to the plug-in female terminal 12 with a such relative orientation that the indication mark 112 points to 3000K.

Specifically, when the plug-in male terminal 11 is connected to the plug-in female terminal 12 with a such relative orientation that the indication mark 112 points to 3000K, the corresponding conduction paths between the power supply component 3 and the light-emitting components 2 are shown in FIG. 2, represented by thick black solid lines: the high-color-temperature path, labeled with W-, passes through the resistor RA1 to 3000K LED-, the low-color-temperature path, labeled with Y-, goes directly to the 3000K LED-.

It should be noted that in one embodiment, the positive terminal of the power supply (corresponding to V+ in FIG. 2) is used as a common terminal, i.e., corresponding to the first pin (the common pin).

Figure 8:
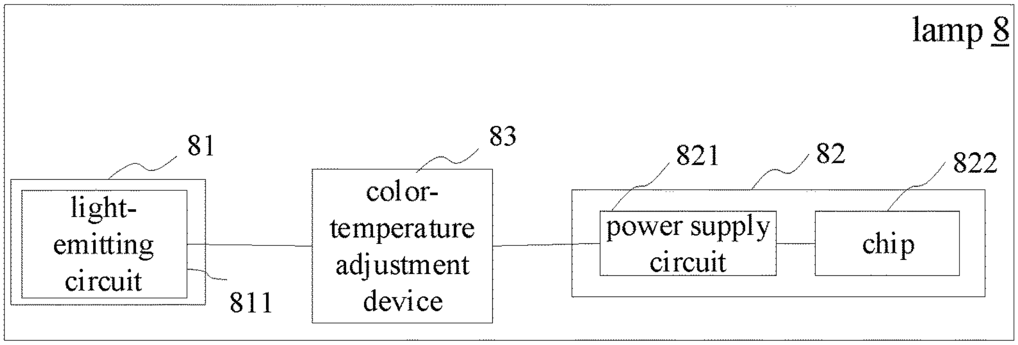
FIG. 8 is a schematic structural diagram of a lamp in one embodiment of the present disclosure.

As shown in FIG. 8, in an embodiment, the lamp 8 of the present disclosure includes a light-emitting component 81, a power supply component 82 and a color-temperature adjustment device 83 as described above.

Specifically, the color-temperature adjustment device 83 is connected to the light-emitting component 81 and the power supply component 82, respectively.

It should be noted that when the plug-in male terminal of the color-temperature adjustment device 83 is connected to the plug-in female terminal of the color-temperature adjustment device 83 with different relative orientations, the power supply component correspondingly outputs different currents based on different conduction paths to adjust the color temperature of the light-emitting component.

In an embodiment, the power supply component 82 includes a power supply circuit 821 and a chip 822.

Specifically, the power supply circuit 821 is connected to the chip 822 and the plug-in female terminal, respectively.

It should be noted that, the chip 822 is configured to control the power supply circuit 821 to output different currents when the plug-in male terminal is connected to the plug-in female terminal with different relative orientations.

In an embodiment, the light-emitting component 81 includes a light-emitting circuit 811.

Specifically, the light-emitting circuit 811 is connected to the plug-in male terminal.

It should be noted that when the lamp 8 adjusts its color temperature, its working principle is the same as that of the above-mentioned color-temperature adjustment device 1. For details, please refer to descriptions of the color-temperature adjustment device.

In one embodiment, the lamp 8 also includes a first housing (not shown in the figures).

Specifically, the power supply component 82 is provided in the first housing.

It should be noted that the first housing is made of a fireproof metal material to protect the power supply component 82 (in the related technology, a dip switch for color-temperature adjustment is located in the first housing).

In one embodiment, the lamp 8 also includes a second housing (not shown in the figures).

Specifically, the light-emitting component 81 is located in the second housing.

It should be noted that the second housing is made of metal, which has good thermal conductivity.

It should be noted that the lamp of the present disclosure can be a downlight, but it is not limited to downlights. For example, it can also be any other split-type luminaire (a split-type luminaire refers to a lighting fixture that has separate components). That is, the above-mentioned color-temperature adjustment device can be applied not only to downlights but also to any other split-type luminaire.

Specifically, during the installation of the luminaire, the desired color temperature can be set by plugging the plug-in male terminal into the plug-in female terminal with a relative orientation corresponding to the desired color temperature; if, after the luminaire is installed, the color temperature of the luminaire needs to be changed, the plug-in male terminal can be removed from the plug-in female terminal, and then the plug-in male terminal can be re-plugged into the plug-in female terminal with a new relative orientation corresponding to the new desired color temperature, without the need to remove the first housing and then dial as in the prior art.

In summary, in contrast to the existing technology, the color-temperature adjustment device and lamp of the present disclosure transfer the color temperature adjustment function from the dip switch inside the power supply box to the plug-in male terminal and the plug-in female terminal. On the one hand, this eliminates the need for a dip switch, reduces the number of parts, and saves materials and manufacturing costs. On the other hand, it allows for setting the desired color temperature during the installation process of the lamp, achieving seamless switching of color temperature without the need of using a dip switch to change the color temperature after the wire connection has been completed. This makes operation convenient and reliable, while also eliminating the need for low-reliability dip switches used for color temperature adjustment; after installation, if it is necessary to change the color temperature of the lamp, in the present disclosure all that is needed is to remove the light-emitting component and then reconnect the plug-in male terminal and plug-in female terminal with different relative orientations to change the color temperature. There is no need to take down the power supply box or change the color temperature via a dip switch. Therefore, the present disclosure effectively overcomes various shortcomings of the prior art and has a high industrial value.

The above-mentioned embodiments are merely illustrative of the principle and effects of the present disclosure instead of limiting the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A color-temperature adjustment device, including a plug-in male terminal and a plug-in female terminal;

wherein a first end of the plug-in male terminal is connected to a first end of the plug-in female terminal, and a second end of the plug-in male terminal is configured to connect with a light-emitting component;

a second end of the plug-in female terminal is configured to connect to a power supply component;

wherein a color temperature of the light-emitting component is determined by an orientation of the plug-in male terminal relative to the plug-in female terminal when the two are connected;

wherein the plug-in male terminal includes a first pin and at least two second pins; the plug-in female terminal includes a first socket and at least two second sockets; the first pin is configured to insert into the first socket; each of the at least two second pins is configured to insert into one of the at least two second sockets; each of the at least two second sockets corresponds to a color temperature, and the at least two second sockets correspond to different color temperatures, respectively.

2. The color-temperature adjustment device according to claim 1, wherein the plug-in male terminal is connected to the plug-in female terminal by a threaded connection when the two are connected.

3. The color-temperature adjustment device according to claim 1, wherein the plug-in male terminal is provided with an indication mark, the plug-in female terminal is provided with at least two color temperature marks, and each of the at least two color temperature marks corresponds to one of the at least two second sockets;

wherein when connecting the plug-in male terminal to the plug-in female terminal, the color temperature of the light-emitting component is adjusted by adjusting the orientation of the plug-in male terminal relative to the plug-in female terminal so that the indication mark points to different color temperature marks.

4. The color-temperature adjustment device according to claim 1, further including a first connection line and a second connection line;

wherein the plug-in male terminal is configured to connect to the light-emitting component via the first connection line;

wherein the plug-in female terminal is configured to connect to the power supply component via the second connection line.

5. The color-temperature adjustment device according to claim 1, wherein the plug-in male terminal and the plug-in female terminal are each formed by one-piece molding.

6. A lamp, including: a light-emitting component, a power supply component, and a color-temperature adjustment device according to claim 1;

wherein the color-temperature adjustment device is connected to the light-emitting component and the power supply component, respectively;

wherein when the plug-in male terminal of the color-temperature adjustment device is connected to the plug-in female terminal of the color-temperature adjustment device with different relative orientations, the power supply component correspondingly outputs different currents to adjust the color temperature of the light-emitting component.

7. The lamp according to claim 6, wherein the power supply component includes a power supply circuit and a chip, wherein the power supply circuit is connected to the chip and the plug-in female terminal, respectively, wherein the chip is configured to control the power supply circuit to output different currents when the plug-in male terminal is connected to the plug-in female terminal with different relative orientations.

8. The lamp according to claim 6, wherein the light-emitting component includes a light emitting circuit, and the light emitting circuit is connected to the plug-in male terminal.

9. The lamp according to claim 6, further including a first housing, wherein the power supply component is provided in the first housing.

10. The lamp according to claim 6, further including a second housing, wherein the light-emitting component is provided in the second housing.

* * * * *